United States Patent
Yu et al.

(10) Patent No.: US 9,439,174 B2
(45) Date of Patent: Sep. 6, 2016

(54) METHOD AND APPARATUS FOR TRANSMITTING BEAM INFORMATION IN WIRELESS COMMUNICATION SYSTEM

(71) Applicant: Samsung Electronics Co. Ltd., Suwon-si, Gyeonggi-do (KR)

(72) Inventors: Hyun-Kyu Yu, Yongin-si (KR); Tae-Young Kim, Seongnam-si (KR); Su-Ryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 13/850,693

(22) Filed: Mar. 26, 2013

(65) Prior Publication Data

US 2013/0258885 A1    Oct. 3, 2013

(30) Foreign Application Priority Data

Mar. 27, 2012  (KR) .......................... 10-2012-0030967

(51) Int. Cl.
| | |
|---|---|
| *H04W 24/10* | (2009.01) |
| *H04W 72/04* | (2009.01) |
| *H04W 74/08* | (2009.01) |
| *H04W 16/28* | (2009.01) |
| *H04B 7/06* | (2006.01) |
| *H04L 1/18* | (2006.01) |
| *H04W 28/06* | (2009.01) |
| *H04W 48/12* | (2009.01) |

(52) U.S. Cl.
CPC ....... *H04W 72/0406* (2013.01); *H04B 7/0632* (2013.01); *H04B 7/0639* (2013.01); *H04B 7/0695* (2013.01); *H04L 1/188* (2013.01); *H04W 16/28* (2013.01); *H04W 74/08* (2013.01); *H04W 28/06* (2013.01); *H04W 48/12* (2013.01)

(58) Field of Classification Search
CPC . H04W 24/10; H04W 24/08; H04W 52/146; H04W 52/16; H04W 52/241
See application file for complete search history.

(56) References Cited

U.S. PATENT DOCUMENTS

2007/0298803 A1 * 12/2007 Kawabata ......... H04W 36/0055
                                                                 455/436
2010/0322337 A1    12/2010 Ylitalo et al.
(Continued)

FOREIGN PATENT DOCUMENTS

| EP | 2040503 B1 | 2/2010 |
|---|---|---|
| WO | 2011-007258 A2 | 1/2011 |
| WO | 2011-087212 A2 | 7/2011 |

OTHER PUBLICATIONS

Tang et al., "Opportunistic Feedback and Online Optimization for Multiuser MIMO Systems with Linear Receivers", Signals, Systems and Computers, XP031081152, ACSSC 2006, Oct. 1, 2006, pp. 794-798.

(Continued)

*Primary Examiner* — Fan Ng
(74) *Attorney, Agent, or Firm* — Jefferson IP Law, LLP

(57) ABSTRACT

A method and a mobile station of transmitting beam information by a mobile station in a wireless communication system are provided. The mobile station determines whether a particular a particular event according to communication with a base station has occurred, and transmits information on at least one DownLink (DL) transmission beam among N number of DL transmission beams to the base station using a contention-based feedback channel according to a result of the determination.

22 Claims, 10 Drawing Sheets

(56) References Cited

U.S. PATENT DOCUMENTS

2011/0081865 A1  4/2011  Xiao et al.
2011/0255434 A1  10/2011  Ylitalo
2012/0263067 A1  10/2012  Kim
2014/0126476 A1* 5/2014  Kang .................... H04L 1/0026
                                                        370/328

OTHER PUBLICATIONS

Park et al., "On Scheduling for Multiple-Antenna Wireless Networks Using Contention-Based Feedback", IEEE Transactions on Communications, XP011185632, Jun. 1, 2007, vol. 55, No. 6, pp. 1174-1190.

* cited by examiner

METHOD AND APPARATUS FOR TRANSMITTING BEAM INFORMATION IN WIRELESS COMMUNICATION SYSTEM

PRIORITY

This application claims the benefit under 35 U.S.C. §119(a) of Korean patent application filed on Mar. 27, 2012 in the Korean Intellectual Property Office and assigned Serial No. 10-2012-0030967, the entire disclosure of which is hereby incorporated by reference.

BACKGROUND OF THE INVENTION

1. Field of the Invention

The present invention relates to a wireless communication system. More particularly, the present invention relates to a method and an apparatus for transmitting beam information in a wireless communication system.

2. Description of the Related Art

Wireless communication systems are developing to support a higher data rate, in order to satisfy the demand for the continuously increasing wireless data traffic. Fourth Generation (4G) systems, which have started to be commercialized, are being developed mainly towards the improvement of frequency spectral efficiency in order to increase the data rate. However, only the improvement of frequency spectral efficiency is insufficient to satisfy the explosively increasing requirements for the wireless data traffic.

Schemes for addressing such a problem include a scheme using a very wide frequency band. In related-art wireless communication systems (for example, a mobile communication cellular system), a frequency band of 10 or less GHz is usually used and it is very difficult to secure a wide frequency band. Therefore, a related-art wireless communication system secures a wideband frequency of a higher frequency band.

However, the higher the frequency for wireless communication, the larger the path loss of an electric wave. Further, as the path loss of an electric wave increases, the distance the electric wave reaches decreases, to thereby reduce the service coverage area. In order to address this problem, a beam forming technology has been used as a technology for reducing the path loss of an electric wave and increasing the distance the electric wave reaches.

The beam forming includes a transmission beam forming performed on the transmitter side and a reception beam forming performed on the receiver side. Transmission beam forming is a technology of concentrating the arrival area of the electric wave in a particular direction by using a plurality of antennas. Here, an aggregation of the plurality of antennas is referred to as an antenna array and each antenna included in the antenna array is referred to as an array element. The antenna array may be configured in various forms including a linear array, a planar array, etc. Use of the transmission beam forming increases the directivity of a signal, so as to increase the distance by which the signal is transmitted. Moreover, when the transmission beam forming is used, nearly no signals are transmitted in other directions than an oriented direction, which results in a large reduction of signal interference to other receivers.

Meanwhile, the receiver side performs beam forming for an incoming signal by using a reception antenna array. The reception beam forming concentrates the incoming electric wave in a particular direction to thereby increase the sensitivity of the signal received in the particular direction while preventing reception of incoming signals in the other directions to thereby intercept the interference signals.

The beam forming requires a beam selection technology which enables each of a base station and a mobile station to exactly measure a transmission beam and a reception beam and report the most proper beams for communication. However, an obstruction in a link between the base station and the mobile station or a movement of the mobile station may cause a momentary beam change, which may cause a mismatch between reported beam information and information of a proper beam at the time point of transmission of a current signal, to thereby largely deteriorate the performance. Therefore, the related-art wireless communication systems have required a scheme capable of addressing the problem which may be caused by a mismatch in the beam information exchanged between a base station and a mobile station according to a beam change.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for transmitting beam information in a wireless communication system.

Another aspect of the present invention is to provide a method and an apparatus which addresses problems due to a beam mismatch between a base station and a mobile station and enables execution of a more stable communication in a wireless communication system using beam forming.

In accordance with an aspect of the present invention, a method is provided. The method includes determining whether a particular event according to communication with a base station has occurred, and transmitting information on at least one Downlink (DL) transmission beam among N number of DL transmission beams to the base station using a contention-based feedback channel according to a result of the determination.

In accordance with an aspect of the present invention, a method is provided. The method includes determining whether information on at least one UpLink (UL) transmission beam among M number of UL transmission beams is received from a base station within a preset time period, measuring an intensity of N number of DL reference signals transmitted using N number of DL transmission beams from the base station according to a result of the determination, and if a request message requesting feedback of information on the at least one DL transmission beam is received from the base station, transmitting the information on the at least one DL transmission beam to the base station according to a result of the measurement.

In accordance with an aspect of the present invention, a method is provided. The method includes transmitting N number of DL reference signals by using N number of DL transmission beams, and if information on at least one DL transmission beam among the N number of DL transmission beams has been received from a mobile station using a contention-based feedback channel according to a particular event, determining a DL transmission beam to be used for signal transmission to the mobile station among the N number of DL transmission beams, based on the received information on the at least one DL transmission beam among the N number of DL transmission beams.

In accordance with an aspect of the present invention, a method is provided. The method includes transmitting information on a UL transmission beam, which corresponds to at least one UL reference signal having an intensity larger than or equal to a threshold among M number of UL reference signals transmitted using M number of UL transmission beams, to a mobile station, determining whether a response signal to the transmitted information is received within a preset time period, transmitting a request message requesting feedback of information on at least one DL transmission beam to the mobile station according to a result of the determination.

In accordance with another aspect of the present invention, a mobile station is provided. The mobile station includes a controller for determining whether a particular event according to communication with a base station has occurred, and a transmitter for transmitting information on at least one DL transmission beam among N number of DL transmission beams to the base station using a contention-based feedback channel according to a result of the determination.

In accordance with another aspect of the present invention, a mobile station is provided. The mobile station includes a controller for determining whether information on at least one UL transmission beam among M number of UL transmission beams is received from a base station within a preset time period, and for measuring an intensity of N number of DL reference signals transmitted using N number of DL transmission beams from the base station according to a result of the determination, a receiver for receiving a request message requesting feedback of information on at least one DL transmission beam from the base station, a transmitter for, if the request message has been received, transmitting information on the at least one DL transmission beam to the base station according to a result of the measurement.

In accordance with another aspect of the present invention, a base station is provided. The base station includes a receiver, a transmitter for transmitting N number of DL reference signals by using N number of DL transmission beams, and a controller for, if information on at least one DL transmission beam among the N number of DL transmission beams has been received from a mobile station using a contention-based feedback channel according to a particular event, determining a DL transmission beam to be used for signal transmission to the mobile station among the N number of DL transmission beams, based on the received information on the at least one DL transmission beam among the N number of DL transmission beams.

In accordance with another aspect of the present invention, a base station is provided. The base station includes a receiver, a transmitter for transmitting information on a UL transmission beam, which corresponds to at least one UL reference signal having an intensity larger than or equal to a threshold among M number of UL reference signals transmitted using M number of UL transmission beams, to a mobile station, and a controller for determining whether a response signal to the transmitted information is received within a preset time period, and for controlling the transmitter to transmit a request message requesting feedback of information on at least one DL transmission beam to the mobile station, according to a result of the determination.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure proposes a method and an apparatus for transmitting beam information in a wireless communication system. Specifically, the present disclosure proposes a method and an apparatus which enables execution of a more efficient communication using beam forming without the problem of beam mismatch between a base station and a mobile station in a wireless communication system.

In the following description of exemplary embodiments of the present invention, beam selection processes performed in the UpLink (UL) and the DownLink (DL) are discussed with reference to FIGS. 1 and 2, respectively. A typical beam selection process is periodically performed. Therefore, in each of the base station and the mobile station, a beam preferred according to time may continuously change. Further, in each of the base station and the mobile station, a beam IDentifier (ID) corresponding to a good channel state may be continuously tracked.

Hereinafter, a typical beam selection process will be described with reference to FIG. 1.

Figure 1:
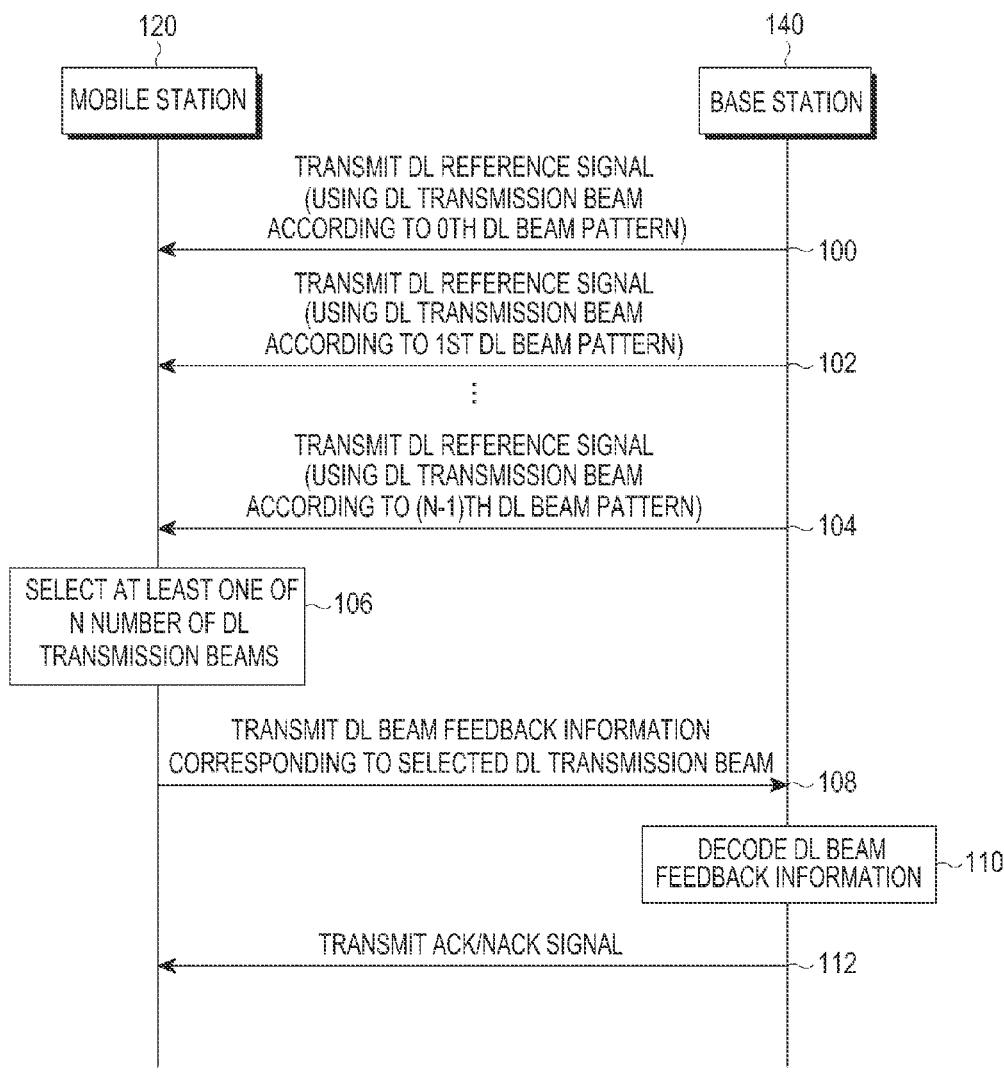
FIG. 1 is a signal flow diagram illustrating a DownLink (DL) beam selection process in a wireless communication system according to an exemplary embodiment of the present invention.

FIG. 1 is a signal flow diagram illustrating a DL beam selection process in a wireless communication system according to an exemplary embodiment of the present invention.

Referring to FIG. 1, a base station 140 transmits DL reference signals to a mobile station 120 by using DL transmission beam patterns (hereinafter, each of which is referred to as a "DL beam pattern") according to N (N≥1) number of different DL transmission beam directions in steps 100, 102, and 104. That is, the base station 140 transmits N number of DL reference signals to the mobile station 120 while changing the DL transmission beam direction according to each of the N number of DL beam patterns.

Specifically, in step 100, the base station 140 transmits a DL reference signal to the mobile station 120 by using a DL transmission beam according to the 0th DL beam pattern among the N number of beam patterns. Further, in step 102, the base station 140 transmits a DL reference signal to the mobile station 120 by using a DL transmission beam according to the 1st DL beam pattern among the N number of beam patterns. Moreover, in step 104, the base station 140 transmits a DL reference signal to the mobile station 120 by using a DL transmission beam according to the (N−1)th DL beam pattern among the N number of beam patterns.

Then, the mobile station 120 receives the N number of DL reference signals from the base station 140 and acquires size information, ID, and other information in relation to the N number of DL transmission beams based on the N number of DL reference signals. The size information of the N number of DL transmission beams may include, for example, measured signal intensity information of each of the N number of DL transmission beams.

In step 106, based on the acquired information, the mobile station 120 selects at least one DL transmission beam preferred by the mobile station 120 from the N number of DL transmission beams. Then, in step 108, the mobile station 120 transmits beam information of the selected at least one DL transmission beam to the base station 140 as DL beam feedback information. The DL beam feedback information includes, for example, ID information of the selected at least one DL transmission beam or size information of the selected at least one DL transmission beam.

The base station 140 receives the DL beam feedback information from the mobile station 120 and in step 110 decodes the received DL beam feedback information to determine whether the DL beam feedback information has an error. Further, in step 112, the base station 140 transmits an ACKnowledgement (ACK) or a Negative ACK (NACK) signal to the mobile station 120, so that the DL beam feedback information may be retransmitted from the mobile station 120 based on whether the DL beam feedback information has an error.

Figure 2:
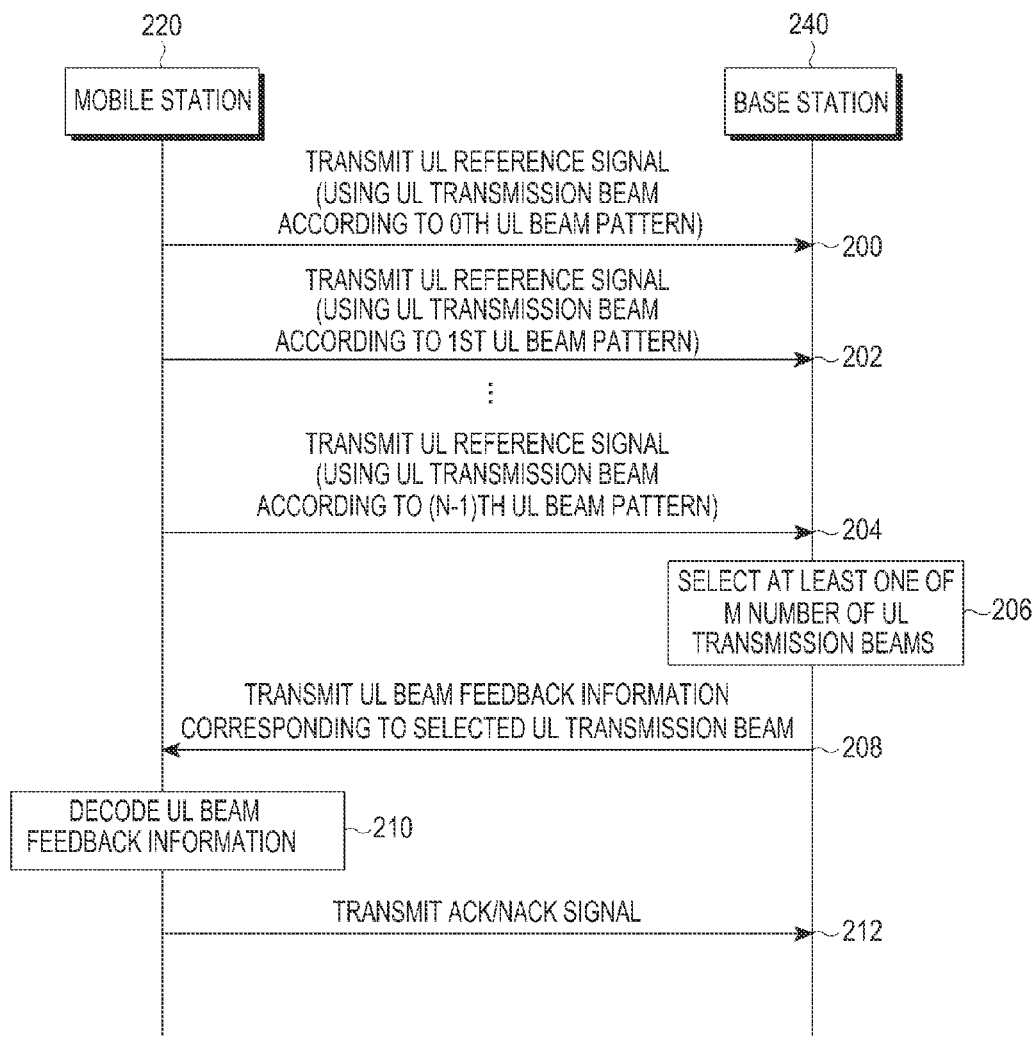
FIG. 2 is a signal flow diagram illustrating an UpLink (UL) beam selection process in a wireless communication system according to an exemplary embodiment of the present invention.

FIG. 2 is a signal flow diagram illustrating a UL beam selection process in a wireless communication system according to an exemplary embodiment of the present invention.

Referring to FIG. 2, a mobile station 220 transmits UL reference signals to a base station 240 by using UL transmission beam patterns (hereinafter, each of which is referred to as a "UL beam pattern") according to M (M≥1) number of different UL transmission beam directions in steps 200, 202, and 204. That is, the mobile station 220 transmits M number of UL reference signals to the base station 240 while changing the UL transmission beam direction according to each of the M number of UL beam patterns.

Specifically, in step 200, the mobile station 220 transmits a UL reference signal to the base station 240 by using a UL transmission beam according to the 0th UL beam pattern among the M number of beam patterns. Further, in step 202, the mobile station 220 transmits a UL reference signal to the base station 240 by using a UL transmission beam according to the 1st UL beam pattern among the M number of beam patterns. Moreover, in step 204, the mobile station 220 transmits a UL reference signal to the base station 240 by using a UL transmission beam according to the (M−1)th UL beam pattern among the M number of beam patterns.

Then, the base station 240 receives the M number of UL reference signals from the mobile station 220 and acquires size information, ID, and other information in relation to the M number of UL transmission beams based on the M number of UL reference signals. The size information of the M number of UL transmission beams may include, for example, measured signal intensity information of each of the M number of UL transmission beams.

In step 206, based on the acquired information, the base station 240 selects at least one UL transmission beam preferred by the base station 240 from the M number of UL transmission beams. Then, in step 208, the base station 240 transmits beam information of the selected at least one UL transmission beam to the mobile station 220 as UL beam feedback information. The UL beam feedback information includes, for example, ID information of the selected at least one UL transmission beam or size information of the selected at least one UL transmission beam.

The mobile station 220 receives the UL beam feedback information from the base station 240 and in step 210 decodes the received UL beam feedback information to determine whether the UL beam feedback information has an error. Further, in step 212, the mobile station 220 transmits an ACK or a NACK signal to the base station 240, so that the UL beam feedback information may be retransmitted from the base station 240 based on whether the UL beam feedback information has an error.

In the periodic beam selection process as described above with reference to FIGS. 1 and 2, a period for execution of the beam selection process is set to correspond to a time period according to a typical average beam change rate in consideration of the efficiency. However, an abrupt appearance of an obstruction in a link between a base station and a mobile station or a movement of the mobile station may cause a momentary beam change. In this event, the beam information reported between the base station and the mobile station may become different from information of a proper beam at the time point of transmission of a corresponding signal, thereby largely deteriorating the performance.

The mismatch of beam information between the base station and the mobile station either may slightly degrade the signal quality or may make it impossible to perform the communication at all. That is, in the case of using only the periodic beam selection process, an abrupt beam change may make it impossible to perform normal communication before the next beam selection process.

In order to address this problem, the period for execution of the beam selection process may be set to be shorter than a time period according to an average beam change rate. However, this method largely increases the system overhead, which results in degradation of the frequency efficiency. Therefore, an exemplary embodiment of the present invention proposes event-driven beam selection method and apparatus which may minimize the increase in the system overhead and trace an abrupt beam change.

The event-driven beam selection method may be divided into a mobile station triggering beam selection method and a base station triggering beam selection method according to the main agent which performs the triggering. That is, according to whether the agent which triggers a DL beam selection process during the course of a UL beam selection process or the agent which triggers a DL beam selection process during the course in which a mobile station reports DL beam feedback information and channel information to a base station is the base station or the mobile station, the event-driven beam selection method may be divided into the mobile station triggering beam selection method and the base station triggering beam selection method.

First, among the two types of beam selection methods, the mobile station triggering beam selection method will be described first.

The mobile station triggering beam selection method includes an event-driven beam selection method (hereinafter, referred to as a "first DL beam selection process") based on a periodic UL beam selection process as described above with reference to FIG. 2 and an event-driven beam selection method (hereinafter, referred to as a "second DL beam selection process") based on a process in which a mobile station periodically transmits DL beam feedback information and channel information to a base station.

Among the two types of DL beam selection processes, the first DL beam selection process will be first described with reference to FIGS. 3 to 8, and the second DL beam selection process will be then described with reference to FIG. 9.

The first DL beam selection process may be divided into three procedures. Among the three procedures, the first procedure will be described with reference to FIGS. 3 and 4, the second procedure will be described with reference to FIGS. 5 and 6, and the third procedure will be described with reference to FIGS. 7 and 8.

Figure 3:
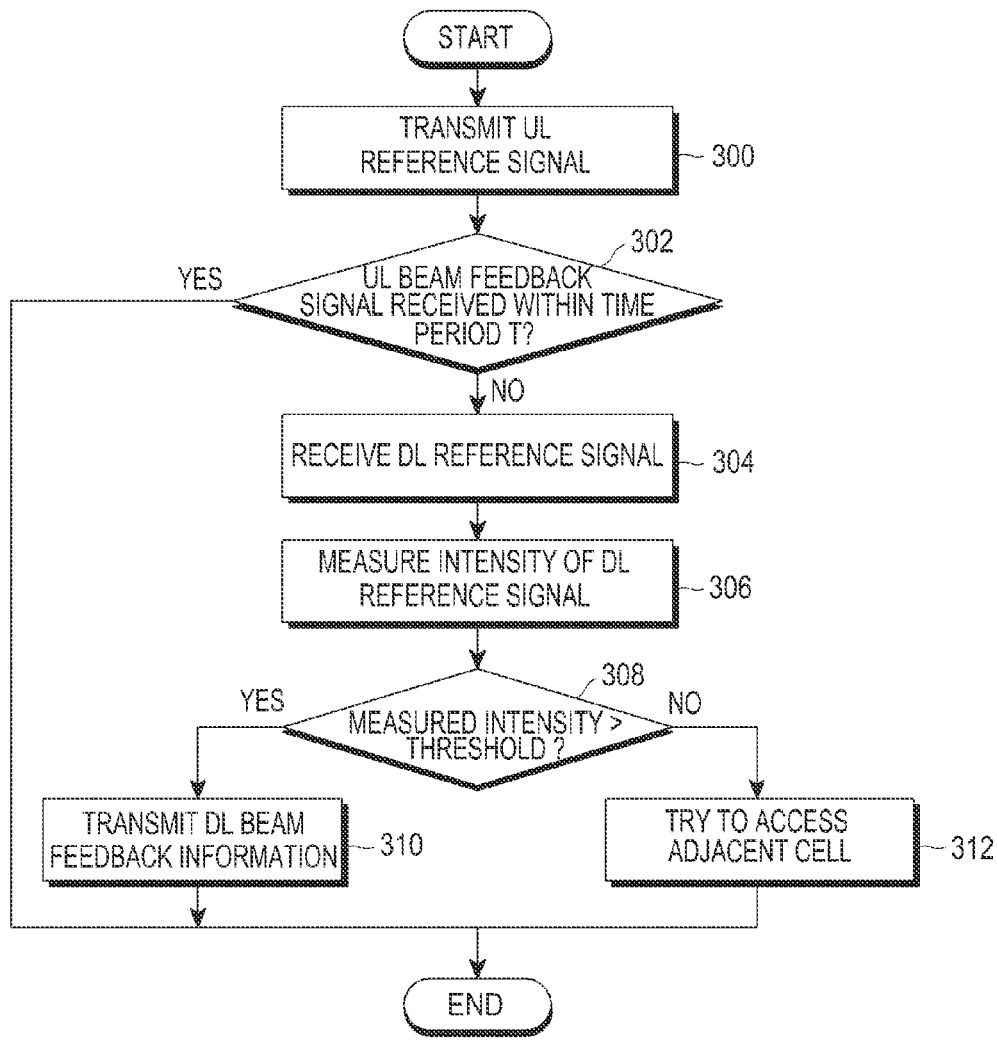
FIG. 3 is a flowchart illustrating a first DL beam selection process of a mobile station in a wireless communication system according to an exemplary embodiment of the present invention.

FIG. 3 is a flowchart illustrating a first DL beam selection process of a mobile station in a wireless communication system according to an exemplary embodiment of the present invention.

Referring to FIG. 3, in step 300, the mobile station transmits M number of UL reference signals to the base station by using UL transmission beams according to M number of UL beam patterns. Further, in step 302, the mobile station determines whether UL beam feedback information is received from the base station within a preset time period T from the time point when the mobile station transmitted the M number of UL reference signals. Here, the UL beam feedback information includes ID information of the UL transmission beam selected by the base station or size information of the selected UL transmission beam. Further, the time period T may be set based on a time period required for reception of UL beam feedback information in a typical UL beam selection process. For example, the time period T may be set as a maximum value of the time period from the time point of transmission of the UL reference signals in step 200 of FIG. 2 to a time point of reception of the UL beam feedback information in step 208 thereof.

When the UL beam feedback information is received within the time period T, the mobile station terminates the process. In contrast, when the UL beam feedback information is not received within the time period T, the mobile station proceeds to step 304. When a UL beam mismatch relating to the base station occurs or when handover is necessary due to movement to another cell, the mobile station may fail to receive the UL beam feedback information within the time period T.

Although not shown in FIG. 3, transmission and reception of the UL beam feedback information may be performed using a Hybrid Automatic Retransmit reQuest (HARQ) scheme. Accordingly, when the mobile station fails to receive the UL beam feedback information within the time period T, the mobile station may transmit a NACK signal indicating failure of reception of the UL reference signal or a signal requesting retransmission of the UL reference signal to the base station.

Further, when a NACK signal indicating failure of reception of the UL reference signal or a signal requesting retransmission of the UL reference signal has been received within the time period T1(T1<T), the mobile station may retransmit at least one UL reference signal, which has been requested to be retransmitted, among the M number of UL reference signals, to the base station. The time period T1 is included in the time period T, and may include a time that HARQ operation is performed after transmission of the UL reference signal.

When the mobile station has consecutively transmitted a preset number of one or more NACK signals with respect to the UL beam feedback information to the base station or the UL beam feedback information is not received within the time period T, the mobile station determines that there is a DL beam mismatch between the base station and the mobile station, and thus performs the following operations.

The mobile station receives N number of DL reference signals having been transmitted using DL transmission beams according to N number of DL beam patterns from the base station in step 304. Thereafter, the mobile station measures the intensity of the N number of received DL reference signals in step 306, and determines whether at least one DL reference signal among the N number of DL reference signals has an intensity exceeding a threshold in step 308.

When at least one DL reference signal among the N number of DL reference signals has an intensity exceeding the threshold, the mobile station proceeds to step 310 in which the mobile station transmits information (e.g., DL transmission beam ID information) on a DL transmission beam corresponding to the at least one DL reference signal having an intensity exceeding the threshold to the base station as DL beam feedback information. Here, the DL beam feedback information may be transmitted through a channel indicated by the base station, a predetermined channel, or a predefined beam information feedback channel. The beam information feedback channel may be periodically determined and may be used as an inter-mobile station contention-based channel.

Meanwhile, when the N number of DL reference signals do not include a DL reference signal having an intensity exceeding the threshold, the mobile station proceeds to step 312, in which the mobile station tries to access an adjacent cell through a random access channel, etc.

Figure 4:
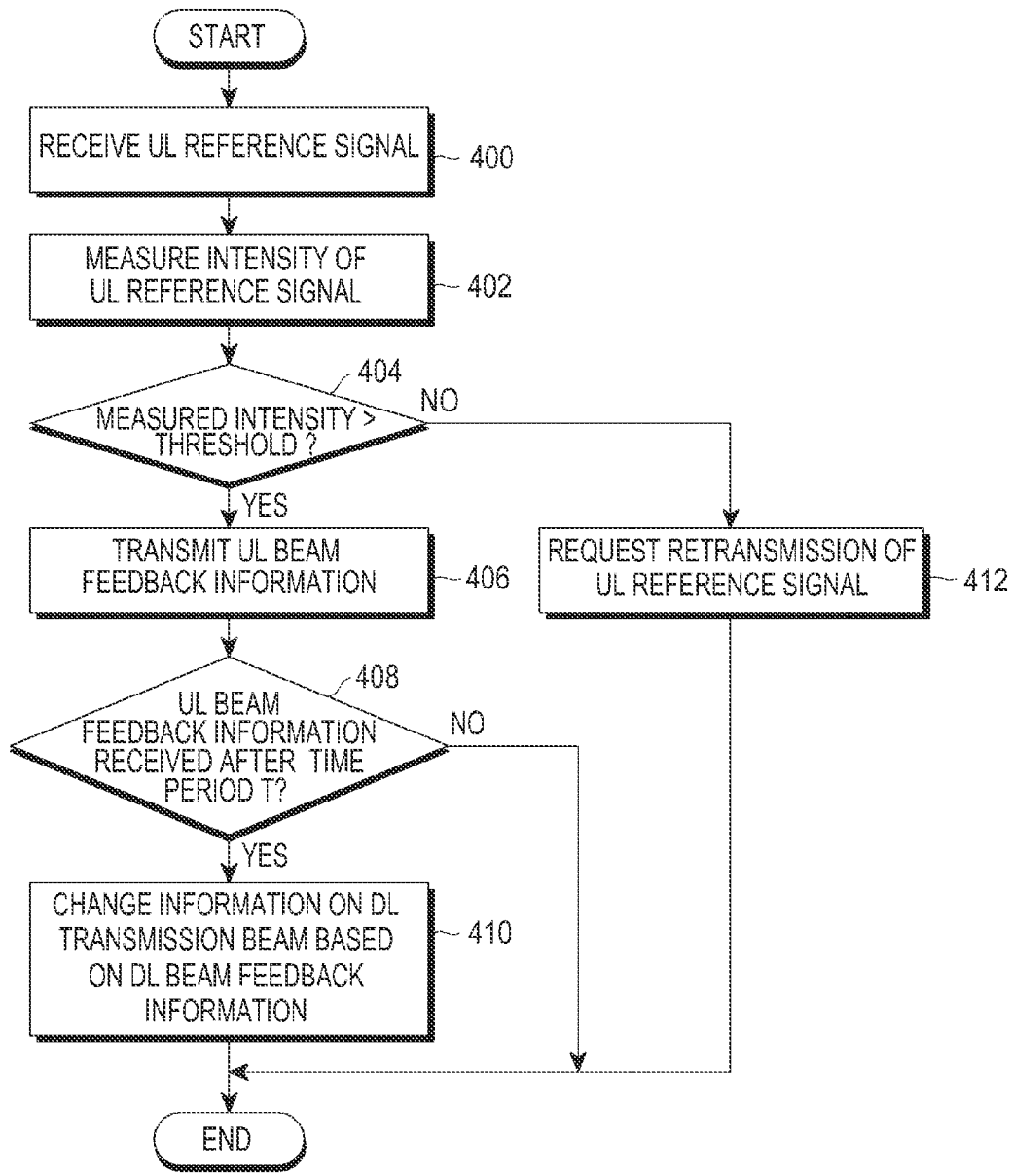
FIG. 4 is a flowchart illustrating a first DL beam selection process of a base station in a wireless communication system according to an exemplary embodiment of the present invention.

FIG. 4 is a flowchart illustrating a first DL beam selection process of a base station in a wireless communication system according to an exemplary embodiment of the present invention.

Referring to FIG. 4, in step 400, a base station receives M number of UL reference signals from a mobile station by using UL transmission beams according to M number of UL beam patterns.

In step 402, the base station measures the intensity of the M number of received UL reference signals. Then, in step 404, the base station determines whether at least one UL reference signal among the M number of UL reference signals has an intensity exceeding a threshold. When the M number of UL reference signals does not include a UL reference signal having an intensity exceeding the threshold, the base station proceeds to step 412, in which the base station transmits a request for retransmission of the UL reference signal to the mobile station. For example, when the M number of UL reference signals include at least one UL reference signal having an intensity not exceeding the threshold, the base station may determine that the at least one UL reference signal has not been successfully received, and thus transmit a NACK signal for the at least one UL reference signal to the mobile station.

Further, when at least one UL reference signal among the M number of UL reference signals has an intensity exceeding the threshold, the base station proceeds to step 406, in which the base station transmits information (e.g. UL transmission beam ID information) on a UL transmission beam corresponding to the at least one UL reference signal having an intensity exceeding the threshold to the mobile station as UL beam feedback information. Here, the UL beam feedback information may be transmitted in various methods, for example, through a transmission method robust against the channel by using a multi-beam or a beam having a width larger than that of a beam of the related art.

In step 408, the base station determines whether DL beam feedback information is received from the mobile station, after a preset time period T (i.e., after a time period required for reception of the UL beam feedback information by the mobile station) from the time point when the base station transmitted the UL beam feedback information. Here, the DL beam feedback information may be received through a channel indicated by the base station, a predetermined channel, or a predefined beam information feedback channel. The beam information feedback channel may be periodically determined and may be used as an inter-mobile station contention-based channel.

When DL beam feedback information is received from the mobile station after the preset time period T, the base station changes information on a DL transmission beam to be used for transmission of a DL signal to the mobile station based on the received DL beam feedback information in step 410. Further, the base station terminates the process when DL beam feedback information is not received from the mobile station after the preset time period T.

Next, a first DL beam selection process of a mobile station and a base station proposed by another exemplary embodiment of the present invention will be described with reference to FIGS. 5 and 6.

Figure 5:
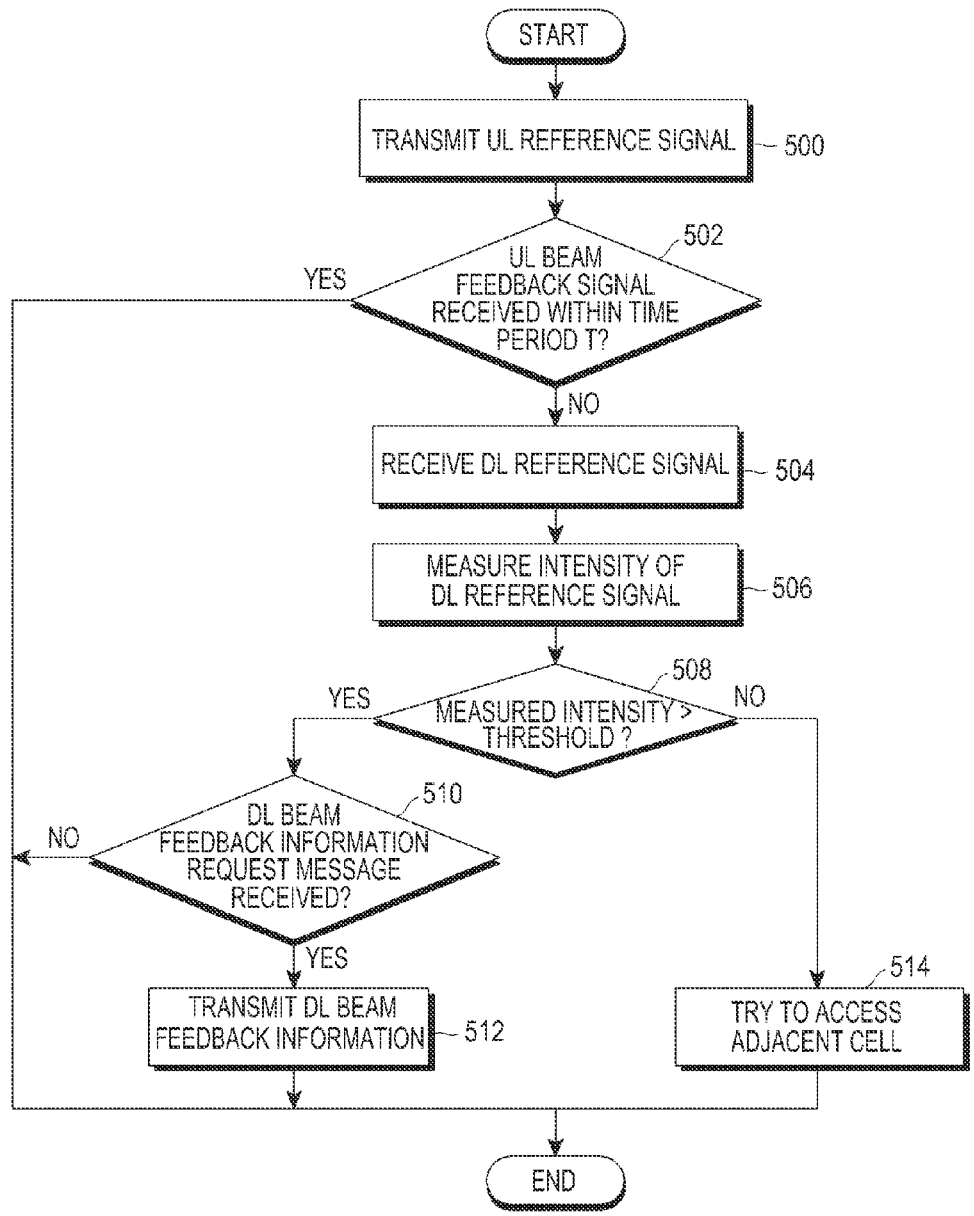
FIG. 5 is a flowchart illustrating a first DL beam selection process of a mobile station in a wireless communication system according to another exemplary embodiment of the present invention.

FIG. 5 is a flowchart illustrating a first DL beam selection process of a mobile station in a wireless communication system according to another exemplary embodiment of the present invention.

Steps 500 to 508 of FIG. 5 are the same as steps 300 to 308 of FIG. 3 described above, so a detailed description thereof will be omitted here. Differently from the exemplary embodiment shown in FIG. 3, in the exemplary embodiment shown in FIG. 5, when at least one DL reference signal among the N number of DL reference signals received from the base station has an intensity exceeding the threshold (as a result of the determination in step 508), the mobile station proceeds to step 510 in which the mobile station determines whether a DL beam feedback information request message from the base station is received.

The DL beam feedback information request message may be transmitted using at least one DL beam among N number of DL beams according to the N number of DL beam patterns used by the base station. Especially, when the base station is not aware of DL beam information usable by the mobile station, the DL beam feedback information request message may be transmitted in the form of beam sweeping by using all of the N number of DL beams.

When a DL beam feedback information request message from the base station has been received, the mobile station transmits information (e.g. DL transmission beam ID information) on a DL transmission beam corresponding to at least one DL reference signal having an intensity exceeding the threshold to the base station as DL beam feedback information in step 512. Here, the DL beam feedback information may be transmitted through a channel indicated by the base station, a predetermined channel, or a predefined beam information feedback channel. The beam information feedback channel may be periodically determined and may be used as an inter-mobile station contention-based channel. When a DL beam feedback information request message from the base station has not been received, the mobile station terminates the process.

Meanwhile, when the N number of DL reference signals does not include a DL reference signal having an intensity exceeding the threshold, the mobile station proceeds to step 514, in which the mobile station tries to access an adjacent cell through a random access channel, etc.

Figure 6:
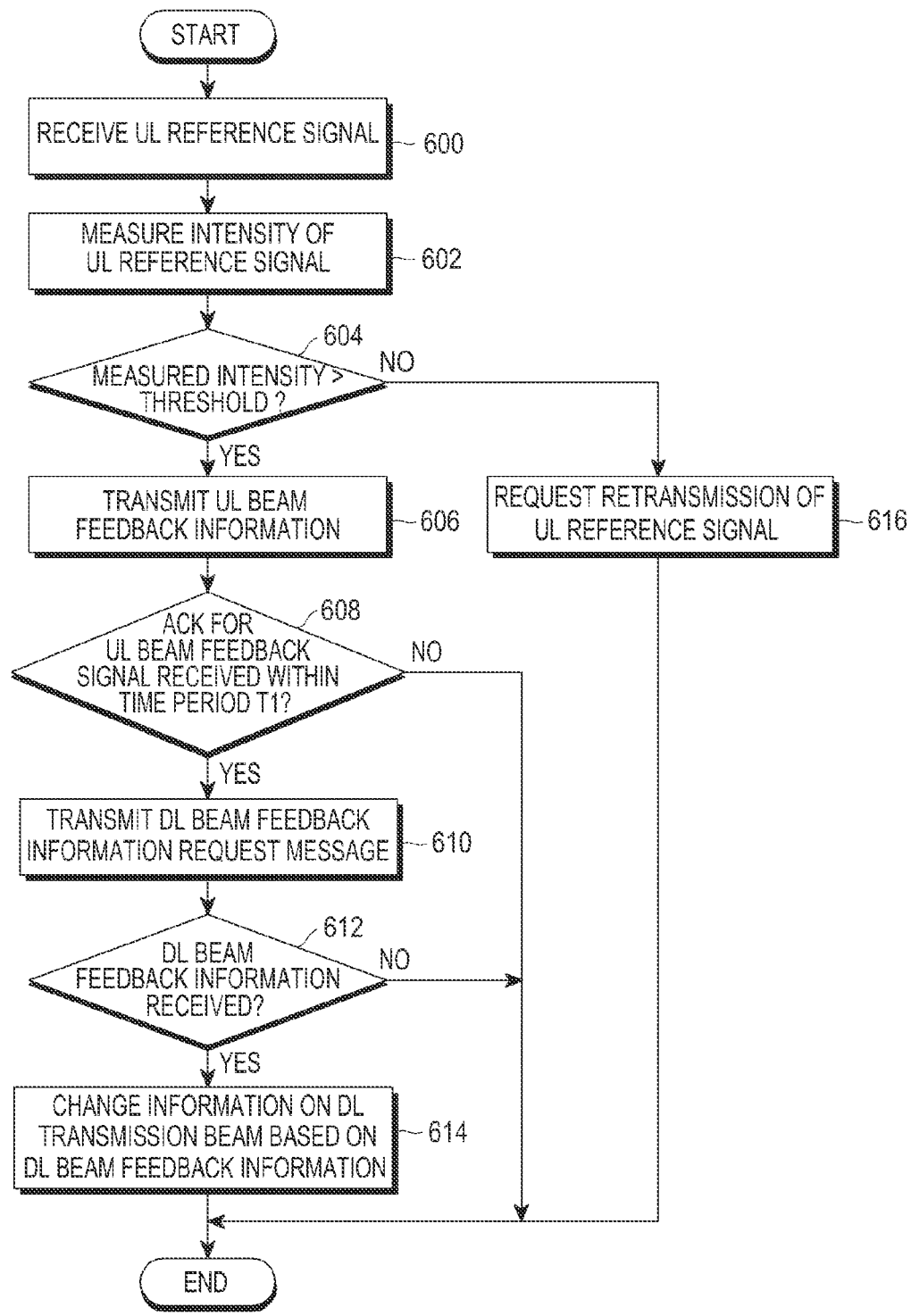
FIG. 6 is a flowchart illustrating a first DL beam selection process of a base station in a wireless communication system according to another exemplary embodiment of the present invention.

FIG. 6 is a flowchart illustrating a first DL beam selection process of a base station in a wireless communication system according to another exemplary embodiment of the present invention.

Referring to FIG. 6, in step 600, the base station receives M number of UL reference signals from a mobile station by using UL transmission beams according to M number of UL beam patterns. When the base station has failed to receive at least one UL reference signal among the M number of UL reference signals, the base station may transmit a NACK signal for the non-received UL reference signal to the mobile station and then receive a retransmitted UL reference signal from the mobile station.

In step 602, the base station measures the intensity of the M number of received UL reference signals. Then, in step 604, the base station determines whether at least one UL reference signal among the M number of UL reference signals has an intensity exceeding a threshold. When the M number of UL reference signals does not include a UL reference signal having an intensity exceeding the threshold, the base station proceeds to step 616, in which the base station transmits a request for retransmission of the UL reference signal to the mobile station. For example, when the M number of UL reference signals include at least one UL reference signal having an intensity not exceeding the threshold, the base station may determine that the at least one UL reference signal has not been successfully received, and thus transmits a NACK signal for the at least one UL reference signal to the mobile station.

Further, when at least one UL reference signal among the M number of UL reference signals has an intensity exceeding the threshold, the base station proceeds to step 606, in which the base station transmits information (e.g., UL transmission beam ID information) on a UL transmission beam corresponding to the at least one UL reference signal having an intensity exceeding the threshold to the mobile station as UL beam feedback information. Here, the UL beam feedback information may be transmitted in various methods, for example, through a transmission method robust against the channel by using a beam having a width larger than that of a multi-beam or a beam of the related art.

In step 608, the base station determines whether an ACK for the transmitted UL beam feedback information is received from the mobile station within a preset time period T1 from the time point when the base station transmitted the UL beam feedback information. When the ACK has been received, the base station concludes that the UL beam selection process has been successfully performed and terminates the process.

In contrast, when the ACK is not received, the base station transmits a DL beam feedback information request message to the mobile station in order to perform a DL beam selection process in step 610. In this event, the base station may transmit the DL beam feedback information request message by using at least one DL beam among N number of DL beams according to the N number of DL beam patterns used by the base station. Especially, when the base station is not aware of DL beam information usable by the mobile station, the base station may transmit the DL beam feedback information request message in the form of beam sweeping by using all of the N number of DL beams.

In step 612, the base station determines whether DL beam feedback information is received from the mobile station within a preset time period T2 from the time point when the base station transmitted the DL beam feedback information request message. When the DL beam feedback information is not received within the preset time period T2, the base station concludes that the DL beam selection process is a failure and terminates the process. When the DL beam feedback information has been received within the preset time period T2, the base station changes information on a DL transmission beam to be used for transmission of a DL signal to the mobile station based on the received DL beam feedback information in step 614.

Next, a first DL beam selection process of a mobile station and a base station proposed by another exemplary embodiment of the present invention will be described with reference to FIGS. 7 and 8. The first DL beam selection process shown in FIGS. 7 and 8 is nearly the same as that shown in FIGS. 3 and 4, except that the base station transmits a signal indicating a cell change to the mobile station when it is not approved that at least one DL reference signal has an intensity exceeding a threshold in the first DL beam selection process shown in FIGS. 7 and 8.

Figure 7:
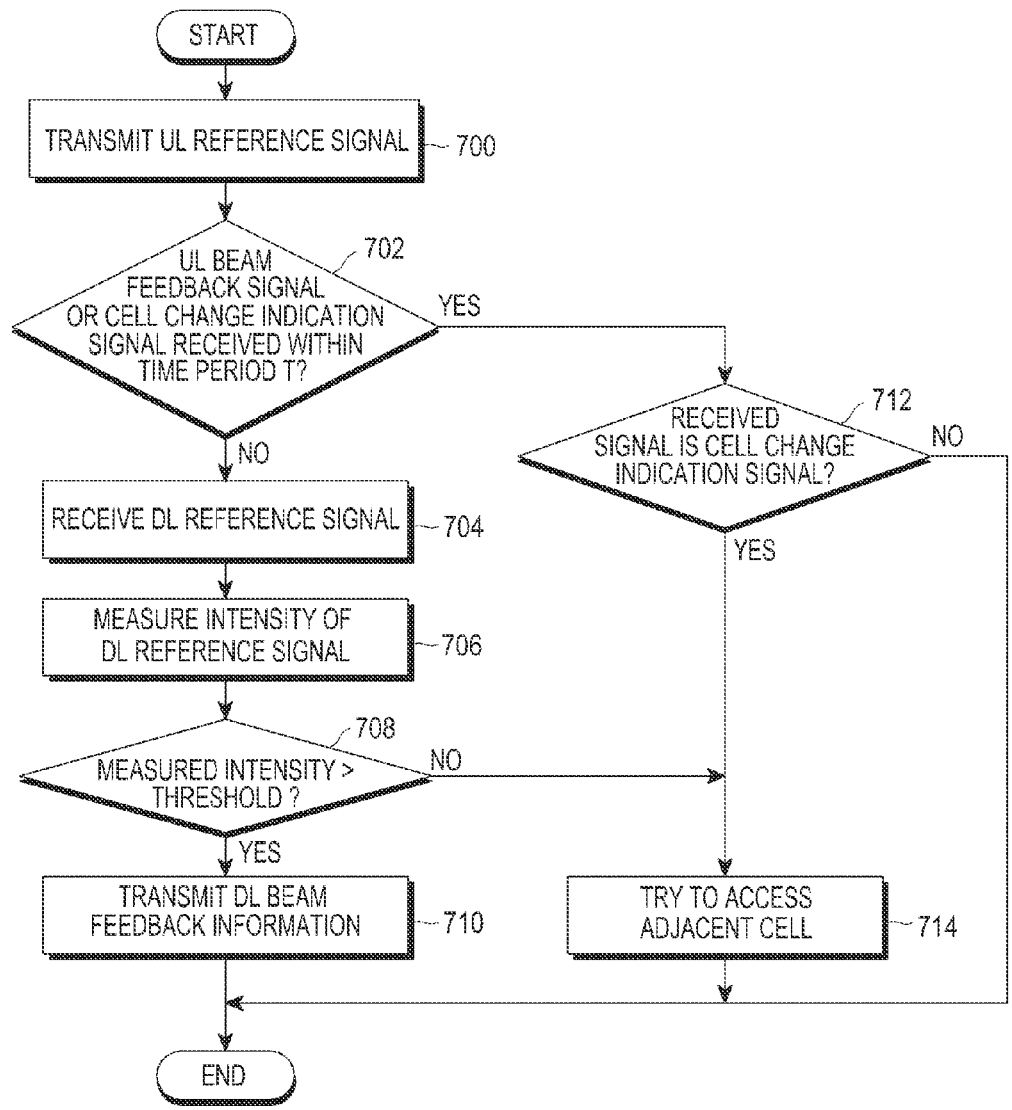
FIG. 7 is a flowchart illustrating a first DL beam selection process of a mobile station in a wireless communication system according to another exemplary embodiment of the present invention.
Figure 8:
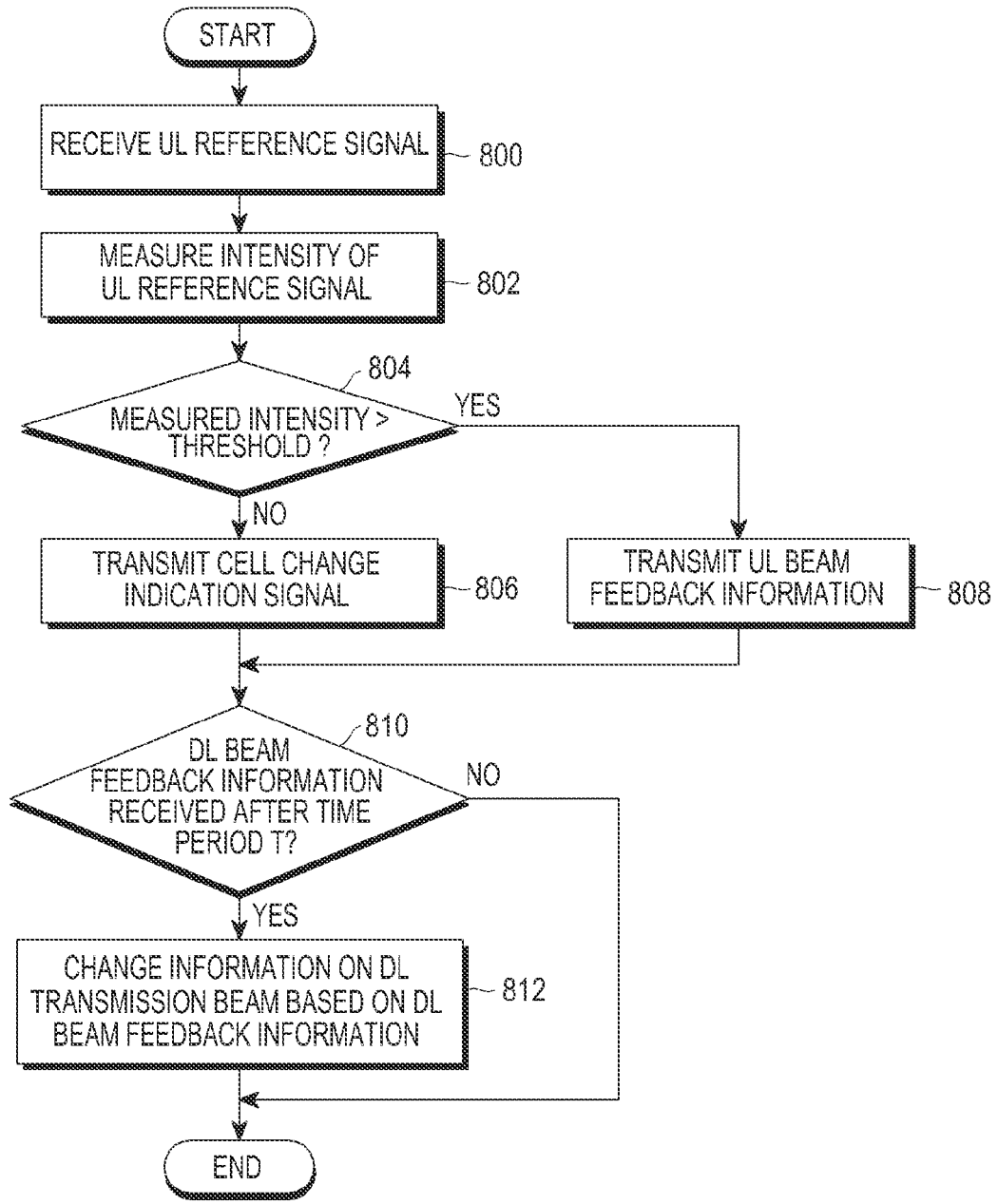
FIG. 8 is a flowchart illustrating a first DL beam selection process of a base station in a wireless communication system according to another exemplary embodiment of the present invention.

FIG. 7 is a flowchart illustrating a first DL beam selection process of a mobile station in a wireless communication system according to another exemplary embodiment of the present invention.

Referring to FIG. 7, in step 700, the mobile station transmits M number of UL reference signals to the base station by using UL transmission beams according to M number of UL beam patterns. Further, in step 702, the mobile station determines whether UL beam feedback information or a cell change indication signal is received from the base station within a preset time period T from the time point when the mobile station transmitted the M number of UL reference signals. Here, the UL beam feedback information includes ID information of the UL transmission beam selected by the base station or size information of the selected UL transmission beam.

When UL beam feedback information or a cell change indication signal is not received within the time period T, the mobile station proceeds to step 704 in which the mobile station receives N number of DL reference signals having been transmitted using beams according to N number of DL beam patterns from the base station.

Thereafter, the mobile station measures the intensity of the N number of received DL reference signals in step 706, and determines whether at least one DL reference signal among the N number of DL reference signals has an intensity exceeding a threshold in step 708. When at least one DL reference signal among the N number of DL reference signals has an intensity exceeding the threshold, the mobile station proceeds to step 710 in which the mobile station transmits information of a DL transmission beam corresponding to the at least one DL reference signal having an intensity exceeding the threshold to the base station as DL beam feedback information. Here, the DL beam feedback information may be transmitted through a channel indicated by the base station, a predetermined channel, or a predefined beam information feedback channel. The beam information feedback channel may be periodically determined and may be used as an inter-mobile station contention-based channel. Thereafter, the mobile station terminates the process.

Meanwhile, when the N number of DL reference signals does not include a DL reference signal having an intensity exceeding the threshold, the mobile station proceeds to step 714, in which the mobile station tries to access an adjacent cell through a random access channel, etc.

Meanwhile, as a result of the determination in step 702, when UL beam feedback information or a cell change indication signal has been received from the base station within a preset time period T, the mobile station proceeds to step 712 in which the mobile station determines whether the received signal is UL beam feedback information or a cell change indication signal.

When the received signal is a cell change indication signal, the mobile station proceeds to step 714 in which the mobile station tries to access an adjacent cell. In contrast, when the received signal is a cell change indication signal, that is, when the received signal is UL beam feedback information, the mobile station terminates the process and performs a communication with the base station by using the UL beam feedback information.

FIG. 8 is a flowchart illustrating a first DL beam selection process of a base station in a wireless communication system according to another exemplary embodiment of the present invention.

Referring to FIG. 8, in step 800, a base station receives M number of UL reference signals from a mobile station by using UL transmission beams according to M number of UL beam patterns. Then, in step 802, the base station measures the intensity of the M number of received UL reference signals.

In step 804, the base station determines whether at least one UL reference signal among the M number of UL reference signals has an intensity exceeding a threshold. When the M number of UL reference signals does not include a UL reference signal having an intensity exceeding the threshold, the base station proceeds to step 806, in which the base station transmits a signal indicating cell change to the mobile station.

Further, when at least one UL reference signal among the M number of UL reference signals has an intensity exceeding the threshold, the base station proceeds to step 808, in which the base station transmits information of a UL transmission beam corresponding to the at least one UL reference signal having an intensity exceeding the threshold to the mobile station as UL beam feedback information. Here, the UL beam feedback information may be transmitted in various methods, for example, through a transmission method robust against the channel by using a beam having a width larger than that of a multi-beam or a beam of the related art.

In step 810, the base station determines whether DL beam feedback information is received from the mobile station, after a preset time period T from the time point when the base station transmitted the cell change indication signal or the UL beam feedback information. The DL beam feedback information may be received through a channel indicated by the base station, a predetermined channel, or a predefined beam information feedback channel. The beam information feedback channel may be periodically determined and may be used as an inter-mobile station contention-based channel. When DL beam feedback information is received from the mobile station after the preset time period T, the base station changes information on a DL transmission beam to be used for transmission of a DL signal to the mobile station based on the received DL beam feedback information in step 812. Further, the base station terminates the process when DL beam feedback information is not received from the mobile station after the preset time period T.

The above description of the exemplary embodiments of the present invention discusses an event-driven first DL beam selection process based on a periodic UL beam selection process of the related art.

Now, the second DL beam selection process which is event-driven and based on a process in which a mobile station periodically transmits DL beam feedback information and channel information to a base station will be discussed.

Figure 9:
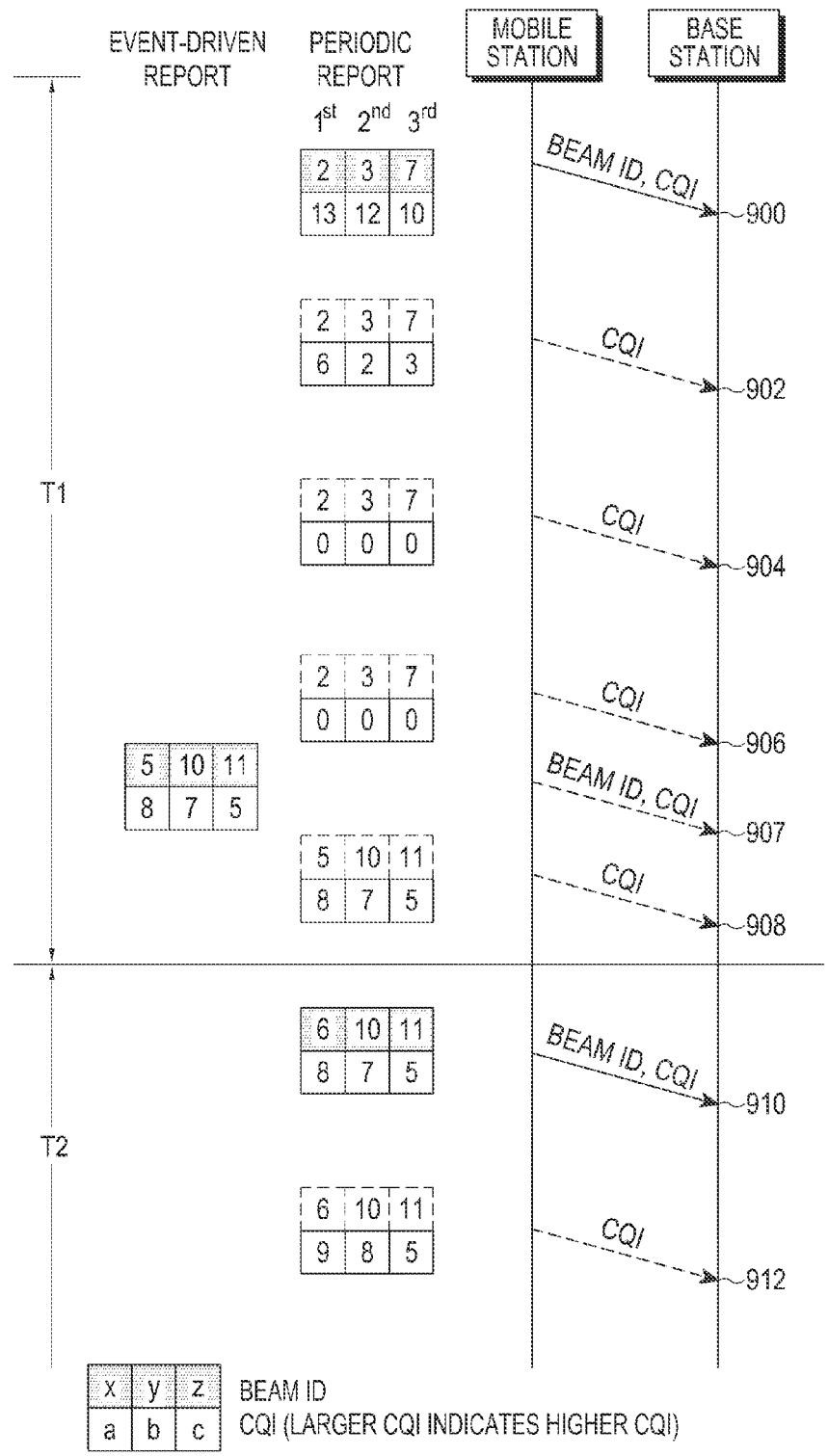
FIG. 9 is a view illustrating a second DL beam selection process in a wireless communication system according to an exemplary embodiment of the present invention.

FIG. 9 is a view illustrating a second DL beam selection process in a wireless communication system according to an exemplary embodiment of the present invention.

The exemplary embodiment shown in FIG. 9 corresponds to an example in which a period for transmission of DL beam feedback information is longer than a period for transmission of channel information. Further, the exemplary embodiment shown in FIG. 9 corresponds to an example in which the DL beam feedback information is DL beam ID information, channel information is a Channel Quality Information (CQI), and a preset number of CQIs indicating a channel value equal to or higher than a threshold are transmitted.

Referring to FIG. 9, the mobile station transmits multiple pieces of DL beam ID information (for example, DL beam IDs "2, 3, 7") and CQIs (for example, CQIs "13, 12, 10") corresponding to the DL beam IDs to the base station at a first time point in a time period T1 according to a preset cycle. Then, the mobile station transmits only CQIs for a corresponding DL beam during a time period from the first time point to a time point just before the start of a time period T2 for transmission of the next DL beam ID information. That is, during the time period T1, the mobile station first transmits DL beam IDs "2, 3, 7" and CQIs "13, 12, 10" to the base station in step 900 and then sequentially transmits CQIs "6, 2, 3", "0, 0, 0", and "0, 0, 0" corresponding to the DL beam IDs "2, 3, 7" to the base station before the time period T1 expires in steps 902, 904, and 906.

Meanwhile, when the CQI corresponding to each DL beam ID reported at a particular time point in the time period T1 does not exceed a threshold, the mobile station measures again the CQI of each DL beam based on the intensity of a plurality of DL reference signals. For example, when the threshold of the CQI is "1" and if the CQIs "0, 0, 0", which are equal to or lower than the threshold, have been transmitted a preset number of times (e.g., twice) or more, the mobile station measures the CQI of each DL beam again.

Further, when CQIs exceeding the threshold are detected, the mobile station transmits the detected CQIs (e.g. "8, 7, 5") and IDs (e.g. "5, 10, 11") of DL beams having the detected CQIs to the base station in step 907. The DL beam IDs and the CQIs transmitted according to the event-driven report scheme in step 907 may be transmitted through a periodically determined separate channel, which may be an inter-mobile station contention-based channel. The base station then transmits CQI "8, 5, 7" corresponding to the DL beam ID "5, 10, 11" to the base station before the time period T1 expires in step 908.

Meanwhile, when a DL beam having a CQI exceeding the threshold does not exist, the mobile station tries to access an adjacent cell through a random access channel, etc.

When the time period T1 expires, the mobile station transmits multiple pieces of DL beam ID information (for example, DL beam IDs "6, 10, 11") and CQIs (for example, CQIs "8, 7, 5") corresponding to the DL beam IDs to the base station at a second time point in the time period T2 according to a periodic report scheme in step 910. Then, the mobile station transmits only CQIs (for example, CQIs "9, 8, 5") for a corresponding DL beam during a time period from the second time point to a time point just before the start of a time period T3 for transmission of the next DL beam ID information in step 912.

The above description discusses a mobile station triggering beam selection method. Now, a base station triggering beam selection method will be discussed. The base station triggering beam selection method is a method in which the base station triggers the UL beam selection process, and uses an HARQ feedback channel or a data packet transmitted through a UL by the mobile station.

At a particular time point, the mobile station receives allocation information for an HARQ feedback channel or a UL data packet from the base station and transmits an HARQ-based signal or a UL data packet to the base station according to the allocation information. However, when beam information stored by the base station at a scheduling time point and beam information actually used at a transmission time point do not coincide with each other, the base station may continuously fail to decode the received signal and the intensity of the signal received by the mobile station may not exceed a threshold. In this event, the base station may transmit a signal requesting transmission of a UL reference signal for beam selection to the mobile station, so as to enable beam information to coincide between the base station and the mobile station.

An another method, when the base station fails to successfully receive DL beam feedback information from the mobile station in the periodic DL beam selection process as shown in FIG. 1, the base station may transmit a signal requesting retransmission of a UL reference signal for beam selection to the mobile station. In this process, the DL beam feedback information may be transmitted in various method, for example, according to a transmission method robust against the channel by using a wider beam or a multi-beam. Further, as shown in FIG. 1, retransmission of the DL beam feedback information may be performed based on an ACK/NACK signal transmitted from the base station as shown in FIG. 1.

Hereinafter, an internal construction of a mobile station according to an exemplary embodiment of the present invention will be described with reference to FIG. 10.

Figure 10:
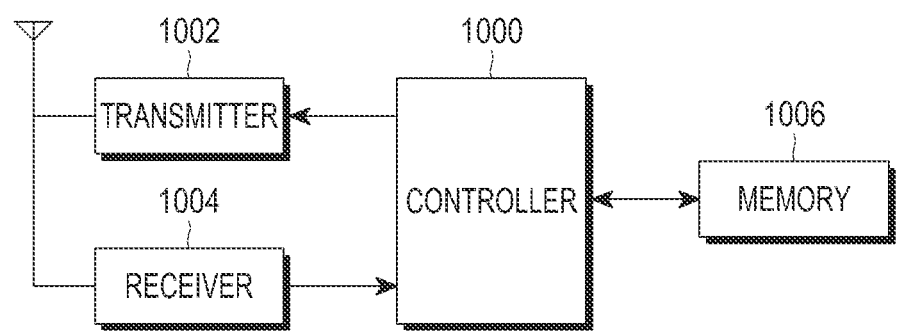
FIG. 10 is a block diagram of a mobile station according to an exemplary embodiment of the present invention.

FIG. 10 is a block diagram of a mobile station according to an exemplary embodiment of the present invention.

Referring to FIG. 10, the mobile station includes a controller 1000, a transmitter 1002, a receiver 1004, and a memory 1006.

The transmitter 1002 and the receiver 1004 are components for communication with a base station, and the memory 1006 is a component for storing various information occurring according to the operation of the mobile station.

The controller 1000 controls the transmitter 1002, the receiver 1004, and the memory 1006, so as to control the general operation of the mobile station. Especially, the controller 1000 performs the operation according to exemplary embodiments of the present invention including the first DL beam selection process and the second DL beam selection process described above with reference to FIGS. 3, 5, 7, and 9.

Figure 11:
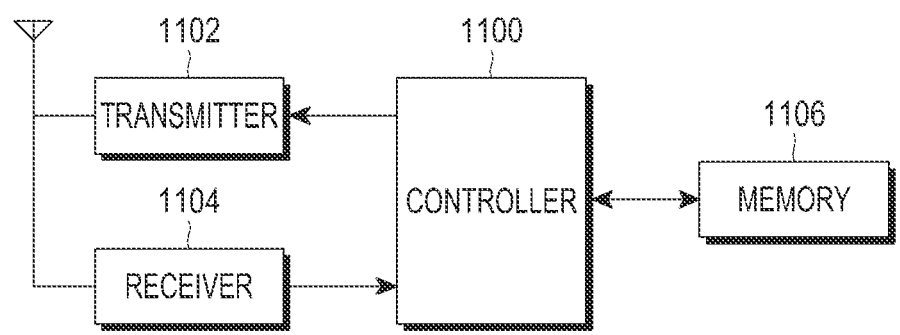
FIG. 11 is a block diagram of a base station according to an exemplary embodiment of the present invention.

FIG. 11 is a block diagram of a base station according to an exemplary embodiment of the present invention.

Referring to FIG. 11, the base station includes a controller 1100, a transmitter 1102, a receiver 1104, and a memory 1106.

The transmitter 1102 and the receiver 1104 are components for communication with a mobile station, and the memory 1106 is a component for storing various information occurring according to the operation of the base station.

The controller 1100 controls the transmitter 1102, the receiver 1104, and the memory 1106, so as to control the general operation of the base station. Especially, the controller 1100 performs the operation according to exemplary embodiments of the present invention including the first DL beam selection process and the second DL beam selection process described above with reference to FIGS. 4, 6, 8, and 9.

When an error has occurred in beam information exchanged between a base station and a mobile station in a wireless communication system using beam forming, the exemplary embodiments of the present invention may rapidly restore the beam information. Further, through the rapid restoration of the beam information against errors, the exemplary embodiments of the present invention enable more stable use of the beam forming technology with respect to beam change. Moreover, the exemplary embodiments of the present invention may address the problem of communication quality degradation, which may be caused due to beam mismatch between the base station and the mobile station. In addition, the exemplary embodiments of the present invention minimizes the system overhead and enables stable communication regardless of abrupt beam change.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for transmitting beam information by a mobile station in a wireless communication system, the method comprising:
   transmitting uplink reference signals through a plurality of uplink transmission beams of the mobile station;
   determining whether uplink feedback information for at least one uplink transmission beam among the plurality of uplink transmission beams is received from a base station within a preset time period;
   receiving, if the uplink feedback information is not received from the base station within the preset time period, downlink reference signals transmitted through a plurality of downlink transmission beams of the base station; and
   transmitting downlink feedback information generated based on receive strengths of the downlink reference signals.

2. The method of claim 1, wherein the transmitting of the downlink feedback information comprises:
   measuring the received strengths of the downlink reference signals;
   determining whether at least one received strength among the measured received strengths is greater than a threshold; and
   transmitting, if at least one receive strength among the measured received strengths is greater than a threshold, the downlink feedback information comprising information related to at least one downlink transmission beam corresponding to the at least one received strength.

3. The method of claim 2, wherein, if the at least one receive strength among the measured received strengths is less than or equal to a threshold, trying to access an adjacent base station.

4. The method of claim 1, wherein the transmitting of the downlink feedback information comprises:
   receiving a transmission request of the downlink feedback information from the base station.

5. The method of claim 1, wherein the preset time period is set as a maximum value of the time period from a transmission time point of the uplink reference signals to a reception time point of the uplink feedback information.

6. The method of claim 1, wherein, if the uplink feedback information is received from the base station, determining that the uplink feedback information indicates a cell change of the mobile terminal; and
   trying, if the uplink feedback information indicates the cell change of the mobile terminal, to access an adjacent base station.

7. A method for receiving beam information by a base station in a wireless communication system, the method comprising:

transmitting uplink feedback information generated based on receive strengths of uplink reference signals transmitted through a plurality of uplink transmission beams of a mobile station;

transmitting downlink reference signals through a plurality of downlink transmission beams of the base station;

determining whether downlink feedback information for at least one downlink transmission beam among the plurality of downlink transmission beams is received from the mobile terminal within a preset time period; and determining, if the downlink feedback information is received from the mobile station, a downlink transmission beam to be used for downlink signal transmission to the mobile station among the plurality of downlink transmission beams based on the downlink feedback information.

8. The method of claim 7, wherein the transmitting of the uplink feedback information comprises:

determining whether at least one receive strength among the receive strengths of the uplink reference signals is greater than a threshold; and generating, if the at least one receive strength is greater than the threshold, the uplink feedback information comprising information related to at least one uplink transmission beam corresponding to the at least one received strength.

9. The method of claim 8, wherein, if at least one receive strength is not greater than a threshold, transmitting a retransmission request for the uplink reference signals to the mobile station.

10. The method of claim 7, wherein the transmitting of the downlink reference signals comprises:

transmitting, if an ACK signal for receiving of the uplink feedback information is received from the mobile terminal, a transmission request of the downlink feedback information to the mobile terminal.

11. The method of claim 7, wherein, if at least one receive strength among the receive strengths of the uplink reference signals is not greater than a threshold, transmitting a signal indicating cell change of the mobile station to the mobile station.

12. A mobile station for transmitting beam information in a wireless communication system, the mobile station comprising:

a transceiver configured to:
transmit uplink reference signals through a plurality of uplink transmission beams of the mobile station, and
transmit downlink feedback information generated based on receive strengths of downlink reference signals;

a controller configured to determine whether uplink feedback information for at least one uplink transmission beam among the plurality of uplink transmission beams is received from a base station within a preset time period; and if the uplink feedback information is not received from the base station within the preset time period, the transceiver is further configured to receive the downlink reference signals transmitted through a plurality of downlink transmission beams of the base station.

13. The mobile station of claim 12, wherein the controller is further configured to:

measure the received strengths of the downlink reference signals, determine whether at least one received strength among the measured received strengths is greater than a threshold, and control, if at least one receive strength among the measured received strengths is greater than a threshold, the transceiver configured to transmit the downlink feedback information comprising information related to at least one downlink transmission beam corresponding to the at least one received strength.

14. The mobile station of claim 12, wherein, if the at least one receive strength among the measured received strengths is less than or equal to a threshold, the controller is further configured to try to access an adjacent base station.

15. The mobile station of claim 12, wherein the transceiver is further configured to receive a transmission request of the downlink feedback information from the base station.

16. The mobile station of claim 12, wherein the preset time period is set as a maximum value of the time period from a transmission time point of the uplink reference signals to a reception time point of the uplink feedback information.

17. The mobile station of claim 12, wherein the controller is further configured to:

determine that the uplink feedback information indicates a cell change of the mobile terminal if the uplink feedback information is received from the base station, and try to access an adjacent base station if the uplink feedback information indicates the cell change of the mobile terminal.

18. A base station for receiving beam information in a wireless communication system, the base station comprising:

a transceiver configured to:
transmit uplink feedback information generated based on receive strengths of uplink reference signals transmitted through a plurality of uplink transmission beams of a mobile station, and
transmit downlink reference signals through a plurality of downlink transmission beams of the base station; and a controller configured to:
determine whether downlink feedback information for at least one downlink transmission beam among the plurality of downlink transmission beams is received from the mobile terminal within a preset time period, and
determine, if the downlink feedback information is received from the mobile station, a downlink transmission beam to be used for downlink signal transmission to the mobile station among the plurality of downlink transmission beams based on the downlink feedback information.

19. The base station of claim 18, wherein the controller is further configured to:

determine whether at least one receive strength among the receive strengths of the uplink reference signals is greater than a threshold, and generate the uplink feedback information comprising information related to at least one uplink transmission beam corresponding to the at least one received strength if the at least one receive strength is greater than the threshold.

20. The base station of claim 18, wherein, if at least one receive strength is not greater than a threshold, the transceiver is further configured to transmit a retransmission request for the uplink reference signals to the mobile station.

21. The base station of claim 18, wherein, if an ACK signal for receiving of the uplink feedback information is received from the mobile terminal, the transceiver is further configured to transmit a transmission request of the downlink feedback information to the mobile terminal.

22. The base station of claim 18, wherein, if at least one receive strength among the receive strengths of the uplink reference signals is not greater than a threshold, the transceiver is further configured to transmit a signal indicating cell change of the mobile station to the mobile station.

* * * * *